United States Patent [19]
Rue et al.

[11] 3,887,480
[45] June 3, 1975

[54] DETERGENT COMPOSITIONS AND METHODS OF MAKING AND USING THEM

[75] Inventors: Larry M. Rue, Inver Grove Heights; Richard E. Freis; Oliver A. Ossanna, both of Bloomington, all of Minn.

[73] Assignee: Economics, Laboratory, Inc., St. Paul, Minn.

[22] Filed: June 24, 1974

[21] Appl. No.: 482,146

Related U.S. Application Data

[63] Continuation of Ser. No. 287,479, Sept. 8, 1972, abandoned.

[52] U.S. Cl. ............ 252/135; 252/99; 252/DIG. 2
[51] Int. Cl. ............................................. C11d 3/04
[58] Field of Search .......... 252/135, 99, 89, DIG. 2, 252/DIG. 10, 357; 260/78.5 E

[56] References Cited
UNITED STATES PATENTS

3,268,491  8/1966  Hattori et al. ............... 252/357
3,301,829  1/1967  Woodward et al. ........... 260/78.5 E
3,563,902  1/1971  Schmackel et al. ........... 252/DIG. 2
3,700,599  10/1972  Mizuno et al. ............... 252/DIG. 10

*Primary Examiner*—William E. Schulz

[57] ABSTRACT

Water soluble polymers are prepared by the process of reacting a first monomer selected from the group consisting of maleic acid, maleic anhydride and alkali metal salts of maleic acid with at least one other copolymerizable monomer in water in the presence of 18 – 40 parts by weight of persulfate catalyst per 100 parts by weight of monomer. The catalyst is preferably potassium persulfate. The resulting polymers are useful ingredients in detergent compositions, especially those used for machine dishwashing.

10 Claims, 1 Drawing Figure

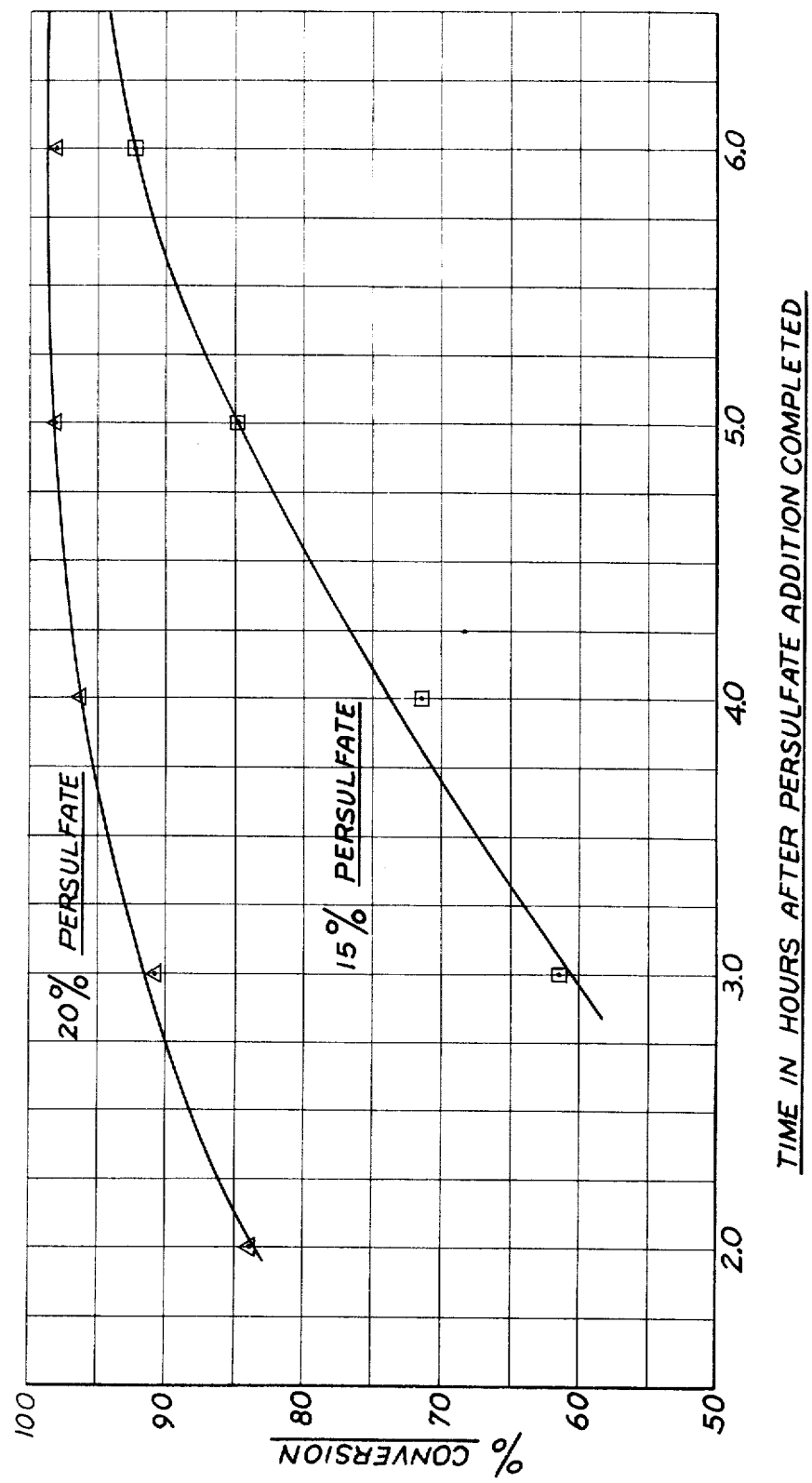

DETERGENT COMPOSITIONS AND METHODS OF MAKING AND USING THEM

CROSS-REFERENCE TO RELATED APPLICATIONS

This application is a continuing application based upon our co-pending application Ser. No. 287,479, filed Sept. 8, 1972 and now abandoned.

BACKGROUND OF THE INVENTION

Polymers of maleic monomers (i.e. maleic acid, maleic anhydride and alkali metal salts of maleic acid) with other copolymerizable monomers are well known in the art and find various uses. For example, U.S. Pat. No. 2,938,016 relates to the production of olefin-maleic anhydride copolymers which are disclosed as being useful as deflocculants and as thickeners for drilling muds.

These polymers are often made in the presence of an organic solvent in which the monomers are soluble, but in which the resulting polymer is insoluble. As a result, the polymer product precipitates from the reaction mixture and is thereafter separated by filtration, centrifugation, or the like. The organic solvents normally employed are typically aliphatic or aromatic hydrocarbons or halogenated hydrocarbons such as benzene, toluene, xylene, hexane, chlorobenzene, and the like. Sometimes, mixtures of solvents are used.

It is also known to prepare such polymers in organic solvents of the same type by maintaining the organic solvent as a discrete water-immiscible layer above a discrete layer of water. The monomers are soluble in the organic solvent which is used, but are insoluble in water. The monomers are reacted in the organic solvent. However, the resulting polymer (a polyelectrolyte) is insoluble in the organic solvent. As it is formed, the polymer precipitates from the organic solvent and falls into the water in which it is soluble. As illustrative of this type of prior art process, see U.S. Pat. No. 2,757,153.

More recently, it has been suggested (U.S. Pat. No. 3,268,491) that the reaction of maleic anhydride with vinyl acetate should be conducted in water provided from 3 – 15 percent by weight of redox catalyst is used and provided the pH is carefully controlled. Persulfates are suggested as the oxidizing agent and sodium acid sulfite is suggested as the reducing agent in the redox catalyst. Organic or inorganic detergent compositions which utilize polymeric materials for water conditioning effects or the like are known. The following U.S. Patents are believed to be representative of the prior art in this field:

U.S. Pat. No. 3,700,599 (Mizuno et al), issued Oct. 24, 1972; U.S. Pat. No. 3,308,067 (Diehl) issued Mar. 7, 1967; U.S. Pat. No. 3,764,559 (Mizuno et al), issued Oct. 9, 1973.

The two Mizuno et al. patents relate generally to detergent compositions for mechanically cleaning hard surfaces, i.e. machine dishwashing compositions. As pointed out in the '559 Mizuno et al. patent, these machine dishwashing detergents can contain 5 to 65% by weight, perferably 20 to 50% by weight of a maleic anhydride copolymer. The other ingredients of the detergent composition can be summarized as follows: (see column 4, line 35 et seq. of the '559 patent)

| Ingredients | Broad Range % by wt. | Preferred Range % by wt. |
|---|---|---|
| Non-phosphate alkaline Detergent Salts | 10 to 95 | 25 to 60 |
| Alkaline Phosphate Salt | 0 to 40 | 10 to 30 |
| Nonionic Surfactant | 0 to 8 | 0.5 to 2.0 |
| Chlorine-Releasing Agent | 0 to 10 | 0.5 to 4.0 |
| Neutral Salts (e.g. NaCl, Na$_2$SO$_4$, etc.) | 0 to 40 | 0 to 20 |

As pointed out in '559, the non-phosphate alkaline salts include the carbonates, bicarbonates, silicates, borates, perborates and the like. Representative alkaline detergent salts are sodium carbonate, sodium bicarbonate, sodium metasilicate, sodium borate, sodium perborate, sodium sesquicarbonates, potassium carbonate, sodium hydroxide, potassium hydroxide, sodium sesquisilicate, sodium orthosilicate, potassium bicarbonate, potassium silicates, and the like. The alkaline phosphate salts include di-, tri- and mono-sodium orthophosphates and alkaline condensed phosphate salts such as tetrasodium pyrophosphate or tetrapotassium pyrophosphate and the polyphosphates such as sodium tripolyphosphate.

The nonionic surfactants are included for their low-foaming or de-foaming properties. As pointed out by the '559 patent, these nonionic surfactants include alkyl phenoxy polyethenoxy compounds, polyoxyalkylene glycols, and other oxyalkylated compounds. See column 3, line 42 et seq. of '559.

The '559 patent goes on to describe the typical chlorinereleasing agents, among which are the alkali metal polychloroisocyanurates, trichloroisocyanuric acid, dichloroisocyanuric acid, sodium or potassium dichloroisocyanurate, [(monotrichloro) tetra-(monopotassium dichloro)] pentaisocyanurate, dichlorodimethyl hydantoin, succinchlorimide, chloramine-T, chloromelamine, chlorinated trisodium phosphate and solid chlorinated caustic soda such as described in U.S. Pat. No. 3,166,512.

The Diehl patent describes an entirely different class of detergent compositions, primarily suited for laundry use. These compositions have high foaming capabilities and typically contain up to about 30% or more of an anionic surfactant with good foaming properties. The aromatic sulfonates, aralkyl sulfonates, and various types of aliphatic sulfonates, sulfates, amides, etc. are representative of these high foaming surfactants.

SUMMARY OF THE INVENTION

The present invention can be viewed as an improvement upon the process of U.S. Pat. No. 3,268,491.

The present invention is based upon the discovery that the rate of conversion of monomers to polymers and the degree of conversion of the monomers can be enhanced provided the reaction is conducted in water in the presence of 18 – 40 parts by weight of persulfate catalyst per 100 parts by weight of monomers. A preferred catalyst is potassium persulfate, which may be used alone or in conjunction with sodium bisulfite.

An aspect of this invention relates to the formulation of a laundry or dishwashing detergent from conventional ingredients and a water conditioning component comprising a polyelectrolyte made according to the teachings of this invention. A particularly preferred class of polyelectrolyte is made from: (a) 35 – 70 mole % maleic monomer; (b) 25 – 40 mole % vinyl acetate; and (c) 2 – 40 mole % acrylic acid, methacrylic acid, or an alkali metal salt thereof. In formulating such a laundry or machine dishwashing (or hand dishwashing) detergent, substantially the teachings of the prior art can be followed, e.g. the Mizuno et al patents. Preferred terpolymers of this invention have been found to offer the advantages of improved solubility in water under acid conditions and better performance in detergents containing alkaline silicates. (As is known in the prior art, the alkaline silicates are particularly useful as detergent builders, corrosion inhibitors, and the like.) In use, the polyelectrolytes made according to this invention have the ability to condition wash water. Accordingly, they are useful in the water conditioning component of dishwashing or laundry detergents, alone or in combination with condensed phosphates or the like.

THE DRAWING

The drawing is a graph showing some of the differences in conversion of monomers which have been noted when using unusually high catalyst levels (e.g. 20% potassium persulfate) as compared to the maximum catalyst level shown in U.S. Pat. No. 3,268,491. Note the significant difference in reaction times needed to achieve 90% conversion of the monomers.

DETAILED DESCRIPTION

The Monomers

The polymers of the present invention will be prepared from a mixture of monomers, the first of which will be a maleic monomer selected from the group consisting of a maleic acid, maleic anhydride, and alkali metal salts of maleic acid (e.g. monosodium maleate). Thus, the present polymers can all be classed as "maleic" polymers. At least one additional copolymerizable monomer will be used to form the polymer. Suitable copolymerizable monomers include those monomers (which may be water-soluble or water-insoluble) which are characterized by the following group:

$$>C=C<$$

and which, when reacted with the first monomer, will form a water-soluble polymer. Examples of such copolymerizable monomers include: styrene; vinyl acetate; acrylic acid; methacrylic acid; vinyl sulfonic acid; itaconic acid; vinyl butyl ether; $C_1$–$C_8$ (alkyl, aminoalkyl and hydroxalkyl) esters of acrylic and methacrylic acids; vinyl ethyl ether; acrylamide; acrylonitrile; aminimides; and metals salts of any of the foregoing acids including specifically the sodium, potassium and ammonium salts.

The reaction of the present invention is applicable to a wide range of maleic polymers and the composition of the polymers can include from as little as 1 mole % of the polymers can include from as little as 1 mole % maleic monomer up to 99 mole % maleic monomer. However, the desired end use of the polymer will often dictate the amount of maleic monomer to be used since all polymers do not serve with equal effectiveness in a given end use application. For example, we have noted that when the polymers are to be used in detergent compositions, particularly those detergents intended for machine dishwashing, very desirable results are obtained with polymers made from a maleic monomer (e.g. maleic anhydride) and vinyl acetate in a mole ratio of from 3:1 to 1:1. Particularly useful products can be made from maleic monomers and vinyl acetate in a mole ratio of from about 2:1 to 1.5:1. These polymers (which are polyelectrolytes) are useful in detergents which are free of alkaline condensed phosphates as well as those which contain such phosphates (e.g. sodium tripolyphosphate).

We have also discovered that the process of the present invention is well suited to the production of polymers which are made from more than two monomers (e.g. from 3 or 4 different monomers). In the course of our work, we have discovered a certain class of terpolymers which are particularly useful as water conditioning agents in detergent compositions, especially those intended for machine dishwashing. These terpolymers can be made by the process of the present invention from the following monomers in the mole percentages indicated:

| MONOMER | MOLE % IN POLYMER | |
|---|---|---|
| | IN GENERAL | PREFERRED |
| 1. maleic monomer | 35–70 | 45–65 (e.g. 50–60) |
| 2. vinyl acetate | 20–45 | 22–40 (e.g. 25–36) |
| 3. acrylic or methacrylic acid (which may be used as the alkali metal salt thereof | 2–40 | 3–30 (e.g. 4–25) |
| TOTAL | | 100 |

In selecting amounts of monomers to be used, it is helpful if the mole ratios of maleic monomer to vinyl acetate are followed. Two very excellent terpolymers are those in which the mole percent of monomers are 60:36:4 and 50:25:25 respectively.

In general, the terpolymers have many of the same advantages or uses in detergents as do the corresponding copolymers made from a maleic monomer and vinyl acetate, only. However, the terpolymers offer the added advantages of improved solubility in water under acid conditions (with some decrease in solubility under alkaline conditions) and better performance in detergents containing alkaline silicates.

The Catalyst

The catalyst used in the process of the present invention will be persulfate or a mixture thereof. Alkali metal persulfates and ammonium persulfate are preferred. Of these, potassium persulfate and ammonium persulfate are particularly preferred. When the resulting polymer is to be used in machine dishwashing detergents, potassium persulfate is the preferred catalyst.

If desired, mixtures of persulfates can be used. In addition, activators, promoters and other catalysts can be used (e.g. sodium bisulfite). However, the present process permits the elimination of bisulfites (e.g. sodium bisulfite) which are commonly used with persulfate catalysts when such catalysts are used at ordinary levels (e.g. 3 – 5% of monomer).

The amount of persulfate catalyst used in the present process will be at least 17 parts by weight per 100 parts by weight of the monomer charge (e.g. the combined weight of maleic anhydride and vinyl acetate). More usually, the amount of persulfate catalyst used will be from 18 – 40% by weight on the same basis. Amounts of about 19 – 30 (e.g. 19 – 25) per cent by weight based upon the total monomer charge appear optimum for many monomer systems.

In calculating the total weight of the monomer charge, it is convenient to ignore any increases in monomer weight resulting from in situ hydrolysis or salt formation (e.g. as by neutralization with sodium hydroxide).

Reaction Conditions

Aside from our use of persulfate catalysts, particularly potassium persulfate, at unusually high levels in the aqueous copolymerization of maleic monomers with other monomers, the reaction conditions which we employ or can employ are those generally employed in the prior art for such types of polymerization reactions. The selection of suitable conditions of temperature, pressure, time, method and rate of addition of the monomers and the like are within the skill of the art, particularly when reference is had to the specific examples which are hereinafter set forth.

The Resulting Polymers

The polymers of the present invention are polyelectrolytes which are useful as water conditioning agents in detergents such as laundry and machine dishwashing detergents. In general, they will find particular utility in automatic or machine dishwashing detergents having a pH of from 7 – 13 (e.g. 9 – 12.5) when measured as a 1 weight % solution in water at 25°C.

The polyelectrolytes will typically have a number average molecular weight of at least 500. Molecular weights of 500 – 30,000 (e.g. 3,000 – 15,000) are common.

Typically, these polymers will be water soluble, at least to the extent of 30 weight % at 25°C. The use of the polymers as the sodium and potassium salts is often desirable.

The present invention can be further understood by reference to the following specific examples which include a preferred embodiment. Unless otherwise indicated, all parts and percentages are by weight.

EXAMPLE I

This example illustrates the preparation of a copolymer of maleic anhydride (55.6 mole %) and vinyl acetate (44.4 mole %) using about 22 parts of potassium persulfate per 100 parts of the total monomer charge.

370 grams of deionized water were charged into a 1 liter resin reaction flask fitted with a reflux condenser, volumetric addition funnel, thermocouple well with a pyrometer, a glass stirrer shaft with teflon blade and a heating mantle. 98.06 grams (1.0 mole) maleic anhydride was added to the reaction flask. 40.0 grams of sodium hydroxide was added to form monosodium maleate. The reaction flask was then purged with nitrogen. The heat of neutralization increased the temperature from 24°C to 80°C in 10 minutes. Cooling was applied to lower the temperature to 59°C. 68.88 grams (0.8 mole) of vinyl acetate was added all at one time. 36.80 grams of potassium persulfate initiator was added in five equal increments of 7.36 grams each at 30 minute intervals. 7.00 grams of sodium bisulfite was dissolved in 30.0 grams of deionized water and added to the reaction flask by means of an addition funnel over a period of 2½ hours. The temperature was maintained at 56° to 65°C during the addition time. The temperature was increased slowly during a reaction time of 5 hours after the completion of the additions to a final temperature of 88°C. 40.0 grams of sodium hydroxide was added slowly with cooling over a period of 8 minutes. The product was a transparent red-brown liquid. A bromine titration indicated 98.11% conversion of the vinyl acetate. A polarographic analysis indicated 100.00% conversion of the maleic anhydride. The Reduced Specific Viscosity (RSV) was 0.1126.[1]

$$^1RSV = \frac{N_{sp}}{C \ (g/100 \ ml)}$$
$$N_{sp} = N_{rel} - 1$$

EXAMPLE 2

This example illustrates the preparation of a terpolymer of maleic anhydride, acrylic acid, and vinyl acetate. The monomer charge consisted of 40 mole % maleic anhydride, 20% vinyl acetate, and 40 mole % acrylic acid using a total of 30.6% potassium persulfate as the catalyst, assisted by 10.2% of sodium bisulfite (all based on the weight of the total monomer charge).

960 ml deionized water and 235.2 g (2.4 moles) of maleic anhydride were charged to a 3 liter resin flask reaction vessel equipped with a thermometer, glass-shafted mechanical stirrer with a teflon blade, a reflux condenser, and two addition funnels. As soon as the maleic anhydride had hydrolyzed to the acid, the acid was neutralized to the monosodium salt with 96 g (2.4 moles) of sodium hydroxide, cooling being required to keep the temperature below 70°C. The pH of the monosodium maleate solution was checked and found to be 2.9. Additional sodium hydroxide was added to bring to pH to 4.2, the desired pH range being 4.0 – 4.2.

A solution of sodium bisulfite was prepared by dissolving 52.3 g (0.50 moles) of sodium bisulfite in 102 ml of deionized water. The final volume was noted and the solution placed in one of the two addition funnels.

An aqueous solution of sodium acrylate was prepared by placing 174 g (2.4 moles) of acrylic acid in 510 ml of deionized water in a one liter Erlenmeyer flask and slowly adding 96 g (2.4 moles) of sodium hydroxide while stirring with a teflon coated magnetic stirring bar and keeping the temperature below 50°C. The sodium acrylate solution was transferred to the other addition funnel.

The monosodium maleate solution in the resin flask was cooled to 50°C and 103.2 g (1.2 moles) of vinyl acetate were added followed by 62.76 g of potassium persulfate. 2/5 of the volume of the sodium bisulfite solution was added over a 15 minute period via the addition funnel and simultaneously the addition of the sodium acrylate solution was begun at a rate so that the total addition time was 3 hours. The addition was continuous.

The polymerization temperature was maintained below the reflux temperature of vinyl acetate and it was slowly raised during the course of the entire reaction until a maximum of 95°C. was attained.

At the end of 1 hour's reaction time, an additional 31.38 g of potassium persulfate was added. Another 1/5 of the sodium bisulfite solution was added over 15 minutes.

At the end of 2 hour's reaction time, another 31.38 g of potassium persulfate was added. Another 1/5 of the sodium bisulfite solution was added in 15 minutes.

At the end of 3 hours reaction time and after all the sodium acrylate solution was in, the final increment of 31.38 g of potassium persulfate was added. The last 1/5 of the sodium bisulfite solution was added over 15 minutes.

The reaction was continued for another 1½ hours. The reaction mixture was then cooled to 50°C and 96g (2.4 mole) of sodium hydroxide were added while maintaining the temperature below 70°C.

A bromine titration showed the conversion of the vinyl acetate and acrylic acid to be 99.77%. Polarographic analysis showed the maleic anhydride conversion to be 99.74%. The relative viscosity (to water) of the polyelectrolyte was 1.1321 (reduced specific viscosity equals 0.1321).

EXAMPLE 3

This example illustrates the preparation of a terpolymer of maleic anhydride, vinyl acetate and methacrylic acid. The monomer charge consisted of 50 mole % maleic anhydride, 25 mole % vinyl acetate, and 25 mole % methacrylic acid. The catalyst was potassium persulfate used at a level of about 20% based upon the total weight of monomers.

700 ml deionized water and 196.1 g (2 moles) of maleic anhydride were charged to a 3 liter flask (used as a reaction vessel) equipped with a thermometer, glass-shafted mechanical stirrer with a teflon blade, a reflux condenser and an addition funnel. As soon as the maleic anhydride had dissolved and/or hydrolyzed to the acid, the acid was neutralized to the monosodium salt with 80 g (2 moles) of sodium hydroxide, cooling being required to keep the temperature below 70°C. the pH of the monosodium maleate solution was adjusted with additional sodium hydroxide to a desired pH range of 4.0 – 4.2.

An aqueous solution of sodium methacrylate was prepared by dissolving 86.1 g (1 mole) of methacrylic acid in 200 ml of deionized water in a 500 ml Erlenmeyer flask and slowly adding 40 g (1 mole) of sodium hydroxide while stirring with a teflon coated magnetic stirring bar and keeping the temperature below 50°C. The sodium methacrylate solution was transferred to the addition funnel.

The monosodium maleate solution was cooled to 40°C., and 86.1 g (1 mole) of vinyl acetate was added followed by 73.64 g of potassium persulfate.

The temperature of the reaction mixture was raised to 65°C and the sodium methacrylate solution was slowly added over 2 hours.

The polymerization temperature was maintained below the reflux temperature of the vinyl acetate. The temperature slowly raised during the course of the reaction until the maximum of 85°C. was attained.

After a total reaction time of 6 hours, the reaction mixture was cooled to 50°C and 80 g (1 mole) of sodium hydroxide was added while maintaining the temperature below 70°C.

A bromine titration showed the conversion of the vinyl acetate and methacrylic acid to be 98.67%. A polarographic analysis showed the maleic anhydride conversion to be 96.04%. The relative viscosity (to water) to the polyelectrolyte was 1.1766 (reduced specific viscosity of 0.1766).

EXAMPLE 4

This example illustrates the preparation of a polyelectrolyte from two monomers using about 30 weight % potassium persulfate as the catalyst (50 mole % maleic anhydride and 50 mole % acrylic acid).

To a 1 liter resin flask reaction vessel equipped with a thermometer, glass-shafted mechanical stirrer with a teflon blade, a reflux condenser, and a pressure-equalizing addition funnel was charged 360 ml deionized water and 98.06g (1 mole) of maleic anhydride. As soon as the maleic anhydride was hydrolized to the acid, the acid was neutralized to the monosodium salt with 40 g (1 mole) of sodium hydroxide, cooling being required to keep the temperature below 70°C. The pH of the monosodium maleate solution was checked and found to be 3.3. A small amount of additional sodium hydroxide was added to bring the pH up to 4.1, the desired pH range being 4.0 – 4.2.

An aqueous solution of sodium acrylate was prepared by placing 72.06g (1 mole) of acrylic acid in 160 ml of deionized water in a 500 ml Erlenmeyer flask and slowly adding 40 g (1 mole) of sodium hydroxide while stirring with a teflon coated magnetic stirring bar and keeping the temperature below 50°C. The sodium acrylate solution was then transferred to the addition funnel.

The monosodium maleate solution was heated to 75°C. and 20.9g of potassium persulfate was added. Simultaneously the addition of the sodium acrylate solution was begun at a rate so that the total addition time was 3 hours. The temperature was maintained between 90° and 95°C throughout the remainder of the course of the reaction.

At the end of 1 hour's reaction time, 10.4 g of potassium persulfate was added.

At the end of 1 hour's reaction time, 10.4 g of potassium persulfate was added.

At the end of 3 hour's reaction time, another 10.4 g of potassium persulfate having been added to the reaction. At this point in the reaction, the addition of the sodium acrylate solution was complete.

The reaction was continued an additional 4 hours, cooled to 25°C. and 40g (1 mole) of sodium hydroxide added to the solution and the temperature kept below 70°C during this addition.

A bromine titration showed the conversion of sodium acrylate to be 99.73%. A polarographic analysis showed the maleic conversion to be 99.30%. The 1% relative viscosity (to water) was 1.1182 (reduced specific viscosity of 0.1182).

EXAMPLE 5

This example illustrates the preparation of a polyelectrolyte from three monomers using about 20 weight % potassium persulfate as the catalyst (60 mole % maleic anhydride. 36 mole % vinyl acetate, and 4 mole % acrylic acid).

370.0 grams of deionized water was charged into a 1 liter resin reaction flask equipped with a reflux condenser, thermocouple with well and pyrometer, a stainless steel stirrer, two volumetric addition funnels and an electric heating mantle. 117.67 grams (1.2 mole) of maleic anhydride was charged into the reaction flask with agitation. 49.34 grams of sodium hydroxide was added, with cooling to maintain the temperature below 70°C., to adjust the pH to 4.4 to form the monosodium salt of maleic acid. 61.98 grams (0.72 moles) of vinyl acetate was added. 36.80 grams (0.136 mole) of potassium persulfate was added. Simultaneous slow addition of the sodium acrylate mixture and the sodium bisulfite mixture was started. The sodium acrylate mixture consisted of 17.28 grams deionized water, 5.76 grams (0.08 mole) of acrylic acid and 3.20 grams (0.08 mole) of sodium hydroxide. The sodium bisulfite mixture consisted of 30.0 grams deionized water and 7.00 grams (0.067 mole) of sodium bisulfite. The additions were made by means of the volumetric addition funnels over a period of 2½ hours. The temperature was maintained at 64° to 70°C. during the addition time and then gradually raised to 74°C. during an additional reaction time of 2½ hours. 48.0 grams (1.2 mole) of sodium hydroxide was then added over a period of 20 minutes with cooling to maintain the temperature below 70°C. The product was a transparent, yellow liquid.

The analysis of the final product was as follows:
1% pH — 10.22
% solids — 42.26
Chelation — 754 mg CaCO$_3$/g (0.2g 100% act. basis)
Reduced specific viscosity — 0.1086

EXAMPLE 6

This example illustrates the preparation of a polyelectrolyte from three monomers using about 18 weight % potassium persulfate as the catalyst (50 mole % maleic anhydride, 25 mole % vinyl acetate and 25 mole % acrylic acid).

To a 1 liter resin flask reaction vessel equipped with a thermometer, glass-shafted mechanical stirrer with a teflon blade, a reflux condenser, and two pressure-equalizing addition funnels was charged 117.68g (1.2 mole) of maleic anhydride and 370g of deionized water followed by 48g of sodium hydroxide (1.2mole). Cooling by means of a water bath was used to keep the temperature below 70°C. The pH of the monosodium maleate solution was checked and found to be 4.0. One gram of sodium hydroxide was added, the pH rechecked and found to be 4.15. The desired pH range was 4.0 to 4.2.

An aqueous solution of sodium acrylate was prepared by placing 43.24g of acrylic acid (0.6 mole) in 129g of deionized water in a 250 ml Erlenmeyer flask and slowly adding 24g of sodium hydroxide while stirring with a teflon coated magnetic stirring bar and keeping the temperature below 50°C. The sodium acrylate solution was then transferred to one of the addition funnels.

A solution of 7g of sodium bisulfite in 30g of deionized water was placed in the other addition funnel.

The monosodium maleate solution was cooled to 62°C. and 51.65g (0.60 mole) of vinyl acetate and 36.80g of potassium persulfate was added. The addition of the sodium acrylate solution and the sodium bisulfite solution was begun at a rate so that the total addition time was 2.5 hours. The temperature was maintained just below the reflux temperature of the vinyl acetate and slowly increased to a maximum of 70°C as the vinyl acetate reacted.

The reaction was continued an additional 3 hours, cooled to 30°C and another 48g (1.2 mole) of sodium hydroxide was added with the temperature kept below 50°C during this addition.

A bromine titration showed the conversion of the vinyl acetate and acrylic acid to be 99.59%. A polarographic analysis showed the maleic coversion to be 98.82%. The 1% relative viscosity (to water) was 1.2022 (reduced specific viscosity of 0.2022).

The chelation value was 841 mg CaCO$_3$/gm.

EXAMPLES 7 AND 8

Polyelectrolytes of Examples 5 and 6 were each tested at various use concentrations in combination with a standardized machine dishwashing detergent formula to determine their suitability for use as a water conditioner in such detergents. Both were found to be effective.

The standard or base formula consisted of 22% anhydrous sodium metasilicate, 20% flake sodium hydroxide, 2% chlorine dry bleach (sodium salt of dichloroisocyanuric acid), 40% coarse sodium sulfate and 16% dense soda ash. In both examples, the standard detergent was used at a concentration of 2000 ppm to clean glasses with hard water in a machine dishwasher. Performance was evaluated in terms of glass filming and spotting.

In Example 7, the polyelectrolyte of Example 5 was tested and performed satisfactorily at 100, 150 and 200 ppm.

In Example 8, the polyelectrolyte of Example 6 performed satisfactorily at 150 and 200 ppm.

What is claimed is:

1. A dishwashing detergent or laundry detergent composition comprising detergent ingredients and, in combination therewith, the following water conditioning agent for said detergent composition:
    a polymer consisting essentially of: (a) 35 – 70 mole % maleic monomer; (b) 20 – 45 mole % vinyl acetate; and (c) 2 - 40 mole % acrylic acid, methacrylic acid, or an alkali metal salt thereof; said polymer having a number average molecular weight of at least 500 and being soluble in water at least to the extent of 30% by weight at 25°C.

2. A detergent composition according to claim 1 wherein said detergent ingredients include an alkaline silicate.

3. A detergent composition according to claim 2 wherein said composition, at 1 weight % concentration in water at 25°C., has a pH ranging from 7 to 13.

4. A detergent composition according to claim 1 wherein said maleic monomer is selected from the group consisting of maleic acid, maleic anhydride, and the alkali metal salts of maleic acid.

5. A detergent composition according to claim 1 wherein said polymer is made by copolymerizing the combination of monomers comprising (a) said maleic monomer, (b) said vinyl acetate, and (c) said acrylic acid, methacrylic acid, or alkali metal salt thereof, in water in the presence of at least 17 parts by weight of a persulfate catalyst per 100 parts by weight of said combination of monomers.

6. In a method of washing articles with a detergent composition containing an alkaline slilcate and having a pH, at 1 weight % concentration in water at 25°C., of 7 to 13, the improvement which comprises the step of: conditioning the water with a water-conditioning amount of said polymer of claim 1.

7. A method according to claim 6 wherein the water-conditioning amount is at least about 100 ppm.

8. The method according to claim 7 wherein said method is carried out in a machine dishwasher.

9. A method for making a dishwasher or laundry detergent comprising the steps of:
    a. providing a polyelectrolyte water conditioning agent by copolymerizing the combination of monomers comprising (1) a maleic monomer selected from the group consisting of maleic acid, maleic anhydride, and the alkali metal salts of maleic acid, and (2) at least one other copolymerizable monomer selected from the group consisting of vinyl acetate, acrylic acid, methacrylic acid, and an alkali metal salt of acrylic or methacrylic acid; said polymerization being carried out in water in the presence of at least 17 parts by weight of a persulfate catalyst per 100 parts by weight of said combination of monomers;

b. combining the resulting polyelectrolyte water conditioning agent with a detergent composition containing an alkaline silicate.

10. A method according to claim 9 wherein said polyelectrolyte has a number average molecular weight of at least 500, is soluble in water at least to the extent of 30 weight % at 25°C., and is derived essentially from: (a) 35 – 70 mole % maleic monomer; (b) 25 – 40% vinyl acetate; and (c) 2 – 40 mole % acrylic acid, methacrylic acid, or an alkali metal salt thereof.

* * * * *